Dec. 13, 1960
P. MODIGLIANI
2,964,439
METHOD OF FORMING A MULTI-LAYER MAT OF
INTERCROSSED FILAMENTS
Filed Dec. 26, 1957
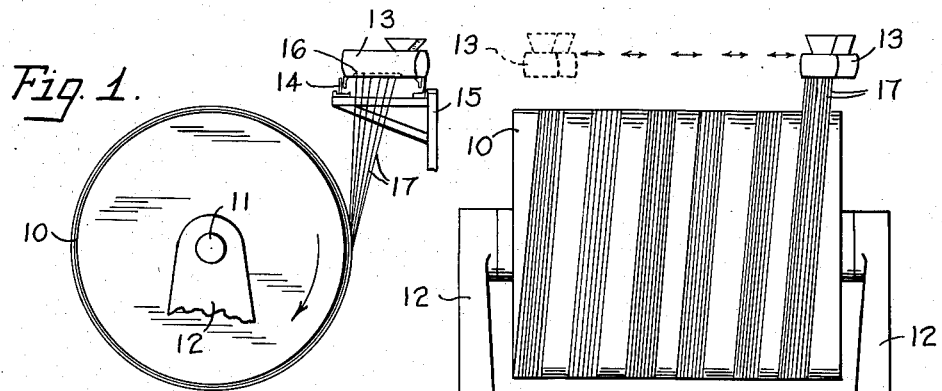
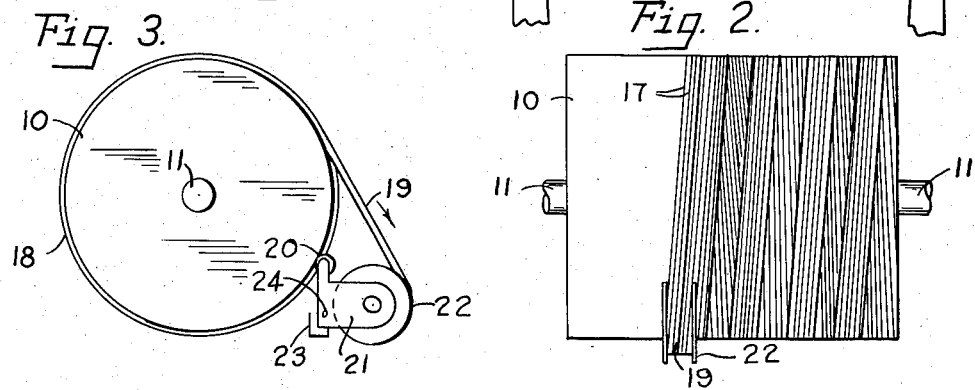
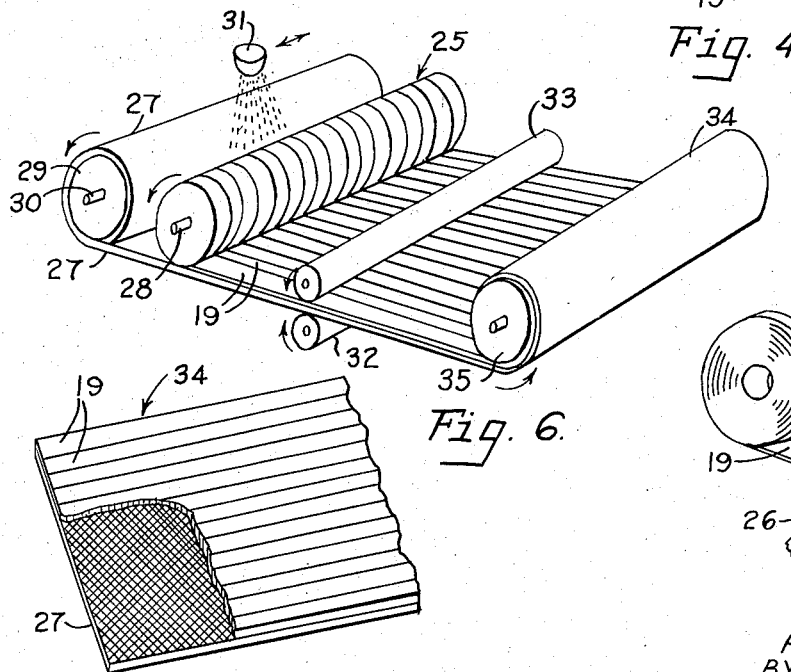
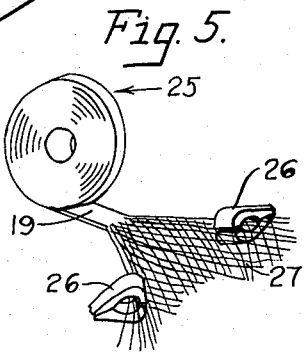
INVENTOR
PIERO MODIGLIANI
BY
John A. McKinney
ATTORNEY

United States Patent Office 2,964,439
Patented Dec. 13, 1960

2,964,439

METHOD OF FORMING A MULTI-LAYER MAT OF INTERCROSSED FILAMENTS

Piero Modigliani, Plandome, N.Y., assignor to Johns-Manville Corporation, New York, N.Y., a corporation of New York Filed Dec. 26, 1957, Ser. No. 705,402

1 Claim. (Cl. 154—90)

This invention relates to a method of forming a mat or sheet of filamentary glass.

Previously, attempts have been made to produce an article of filamentary glass having an expanded base and a condensed mat or layers, for example, in my prior U.S. Patent No. 2,574,221, issued November 6, 1951. In the patented process, a mat is produced by reciprocating a furnace, from which the formation of glass filaments is initiated through a row of orifices, across a rotating drum so that layers of glass filaments, crossed at suitable acute angles, are collected on the drum. When the mat is built up to a desired thickness, it is removed, as a condensed mat, from the drum and stretched or expanded in a direction transversely of the general lay of the filaments to form an elongated mat. After being expanded, the mat is cut transversely of its new length into a plurality of sections each of which is equal in length to the circumference of the forming drum and, in width, to the length of the drum. A section is secured to the forming drum and the furnace is reciprocated across the rotating drum to superimpose a second mat of filamentary glass on the expanded section of the first mat. The finished non-woven fabric thus formed is limited in one dimension to the circumference of the forming drum.

It is the principal object of this invention to provide a method for forming a product including an expanded base mat or layer secured to a condensed mat or layer of filamentary glass having relatively unlimited length.

It is another object of this invention to expand a tape of filamentary glass transversely of its length so as to form a wider tape.

In the instant invention, the furnace is positioned so that its row of orifices extends at roughly right angles to the axis of rotation of the drum. The furnace is reciprocated so that the filaments drawn from the orifices are collected on the drum in adjacent but spaced relation. When a condensed mat of desired thickness is collected on the drum, a spiral cutting apparatus is positioned to cut the condensed mat into a continuous condensed strip or tape which is wound on a spool into a roll. A plurality of these rolls are assembled on a shaft in contiguous relationship so that they may be unwound from the shaft substantially as a unitary mat. As the condensed tapes are unwound from the rolls, they are secured to an expanded mat by a suitable binder to form a non-woven fabric of relatively unlimited length.

The invention will be more fully understood and further objects and advantages thereof will become apparent when reference is made to the following detailed description of a preferred embodiment of the invention and the accompanying drawings in which:

Fig. 1 is an end view of the drum and furnace in operative position;

Fig. 2 is a front elevation of the apparatus of Fig. 1;

Fig. 3 is an end view of the drum and cutter in operative position;

Fig. 4 is a front elevation of the apparatus of Fig. 3 with an element omitted for clarity;

Fig. 5 is a pictorial view showing a tape being expanded;

Fig. 6 is a pictorial view showing the joined tapes being applied to an expanded mat; and Fig. 7 is a pictorial view of a portion of the finished product.

Referring to the drawing, there is disclosed in Fig. 1 a forming drum 10 mounted on the shaft 11 which is journaled for rotation in the supports 12 by any conventional means. The drum 10 rotates in a direction as indicated by the arrow in Fig. 1. A conventional gas fired glass furnace 13 is supported by wheels 14 for movement on the trackway 15. The furnace 13 is provided with an orifice plate 16 having any desired number of rows of orifices and is positioned so that the innermost orifice is directly above the down turning edge of the drum. Conventional means are employed to reciprocate the furnace 13 to and fro in a direction parallel to the axis of rotation of the drum 10. The apparatus described above is similar to that disclosed in my copending application Serial No. 401,006, filed December 29, 1953. It is to be noted, that the rows of orifices in the plate 16 extend roughly at right angles to the axis of rotation of the drum 10 so that the filaments 17 therefrom will be collected, as illustrated in Fig. 2, in adjacent relation but spaced a distance depending upon the degree of inclination of the rows, and the relative speeds of the drum and furnace.

After a condensed mat 18 of filaments 17 has been formed on the drum 10, a cutting apparatus, as illustrated in Figs. 3 and 4, is moved into position to spirally cut a continuous condensed tape 19 from the mat. The cutting apparatus consists of a rotary knife disc 20 mounted in a base 21. A spool 22, on which the condensed tape 19 is wound, is supported for rotation in the base 21. The base 21 is supported for movement along an L-shaped track 23 and is held against rotation by nesting against the legs of the track. A rotatable screw 24, fixed against axial movement by conventional mounting blocks (not shown), is threadedly connected to the base 21. The rotational movement of the screw 24 drives the base 21 transversely back and forth along the track 23. Conventional drive means (not shown) are connected to rotate the screw 24 and the spool 22 at predetermined speeds. Thus, as the cutting apparatus moves along the track 23, a continuous condensed tape 19 is collected on a spool 22. A roll 25 of the condensed tape 19 is indicated in Fig. 5 which also shows a pair of blades or pincers 26 that are used to grasp, stretch, and expand the tape 19 transversely of its length to form an expanded mat 27 having a width many times its original width.

In Fig. 6, there is disclosed apparatus for forming the non-woven fabric illustrated in Fig. 7. A plurality of rolls 25 of condensed tape 19 are assembled on the shaft 28, the number of rolls on the shaft 28 being dependent upon the desired width of the finished product. A mat 27 of tape, expanded as in Fig. 5, or in accordance with the method disclosed in my co-pending application, Serial No. 401,006, filed December 29, 1953, or a mat expanded by any conventional method is formed into a roll 29 on the shaft 30. The mat 27 on the roll 29 can be of any nature or material on which it is desirable to superimpose a relatively long condensed mat of filaments. The shafts 28 and 30 are rotated in the same direction and are so arranged that the condensed tapes 19 are superimposed on the expanded mat 27. A suitable binder is sprayed from a reciprocating tank 31 onto the surface of the mat 27 to be plied against the tapes 19 prior to the contact between the mat 27 and the tapes 19. If desired the binder may of course be applied also, or alternatively, to the surfaces of the tapes 19 to be plied against the mat 27 prior to the contact between the mat and the tapes. The mat 27 and the tapes 19 are secured together during passage between pressure rolls 32 and 33. The finished non-woven fabric 34 is then collected on a roll 35. It is not necessary that the condensed tapes 19 be formed into rolls prior to application to the expanded mat 27. Any arrangement is satisfactory in which the relatively long condensed tapes 19 are ready to be plied to the expanded mat 27 so that the adjacent edges of a plurality of condensed tapes 19 are contiguous.

In operation, a glass furnish is melted in the furnace 13 and when the glass tends to flow from the orifices, filaments 17 are drawn therefrom and placed into contact with the surface of the rotating drum 10. While the drum is rotating to continuously draw the filaments, the furnace 13 is reciprocated to and fro to form a condensed mat 18 of filaments on the drum. The cutting apparatus is then positioned and the screw 24 is rotated by a conventional constant driving source as referred to above so that the knife disc 20 moves across the surface of the drum 10 in a spiral path to cut a continuous tape 19 from the mat 18. As the tape 19 is cut from the drum 10, the tape is collected into a roll 25 on the spool 22.

A roll 25 of tape 19 is then expanded transversely of its length by applying appropriate forces to the cut edges. The expanded mat 27 is then formed into a roll 29 on a shaft 30. If desired an expanded mat 27 may be made in accordance with the method disclosed in my co-pending application, Serial No. 401,006, filed December 29, 1953, or U.S. Patent No. 2,574,221, or a suitable mat may be formed in any other appropriate manner, and then wound into a roll 29 on the shaft 30. A plurality of rolls 25 of condensed or unexpanded tape 19 are assembled in contiguous relationship on the shaft 28. The expanded mat 27 is unwound from the roll 29 and the condensed tapes 19 from the assembled rolls 25 so that the tapes 19 are superimposed on the mat 27. Before the mat 27 and the tapes 19 are actually contacted to be plied together, a suitable binder is sprayed onto one or both of the respective surfaces to be plied. The composite then passes between the compressing rolls 32 and 33 to firmly secure the condensed tapes 19 to the expanded mat 27 to form a finished non-woven fabric 34. In this manner, a non-woven fabric of relatively unlimited length is produced.

For illustrative purposes only, it may be stated that mats were successfully formed from a conventional glass furnish on a drum having a 30 foot circumference. The drum was rotated to have a peripheral speed of 2,600 feet per minute and the furnace was reciprocated at a speed of 20 feet per minute. The cutting apparatus was advanced at a rate to cut tapes three inches in width. The binder used may be a conventional thermosetting or thermoplastic resin.

Obviously, the manipulative steps of forming long tapes, collecting them in contiguous relationship, and plying them with a long base sheet or sheets might be practiced to advantage with tapes and sheets other than the specific filamentary condensed tapes and expanded mats referred to in the examples given in the above description, but it will be appreciated that the invention has a special significance with regard to the plying of expanded and condensed filamentary materials as described.

Having thus described the invention in rather full detail, it will be understood that these details need not be strictly adhered to and that various changes and modifications may suggest themselves to one skilled in the art, all falling within the scope of the invention as defined by the subjoined claim.

What I claim is:

A method for forming a non-woven fabric comprising, forming a condensed mat of a plurality of layers of filaments on the surface of a drum, spirally cutting said mat to form a tape having a length much greater than the circumference of said drum, collecting said tape into a roll, repeating said method to form a plurality of rolls of tape, and further comprising expanding one of said rolls of tape transversely of its length to form an expanded mat of relatively unlimited length, joining a plurality of said rolls on a shaft so that the cut edges are in contiguous relationship, unwinding said tapes in unison from said rolls, and plying said tapes to said expanded mat to form a non-woven fabric of relatively unlimited length with the adjacent edges of said tapes in contiguous relationship.

References Cited in the file of this patent

UNITED STATES PATENTS

| 2,574,221 | Modigliani | Nov. 6, 1951 |
| 2,826,237 | Carlson | Mar. 11, 1958 |

FOREIGN PATENTS

| 554,180 | Great Britain | June 23, 1943 |